US007543984B2

(12) United States Patent
Begero et al.

(10) Patent No.: US 7,543,984 B2
(45) Date of Patent: Jun. 9, 2009

(54) TEMPERATURE SENSOR FOR A HEATING MECHANISM AND METHOD FOR CONTROLLING THE HEATING MECHANISM

(75) Inventors: Klaus Begero, Bretten (DE); Lutz Ose, Sternenfels (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 184 days.

(21) Appl. No.: 11/562,182

(22) Filed: Nov. 21, 2006

(65) Prior Publication Data

US 2007/0121704 A1 May 31, 2007

(30) Foreign Application Priority Data

Nov. 25, 2005 (DE) ....................... 10 2005 057 105

(51) Int. Cl.
*G01K 5/56* (2006.01)
*G01K 5/62* (2006.01)

(52) U.S. Cl. ....................... 374/187; 374/198; 374/200; 374/205

(58) Field of Classification Search ................. 374/187, 374/195, 197, 198, 200, 205–206; 219/268, 219/448.16, 448.18, 448.19; 337/1, 394, 337/396, 16, 38, 41–43, 46, 77, 82–84, 85–86, 337/94, 102–103, 105
See application file for complete search history.

(56) References Cited

U.S. PATENT DOCUMENTS 2,924,700 A * 2/1960 Huffman .................... 219/442
3,612,826 A * 10/1971 Deaton .................... 219/445.1
3,732,518 A * 5/1973 Them et al. ................. 337/394
3,906,424 A * 9/1975 Clancy et al. ............... 337/394
3,921,198 A * 11/1975 Pohl ........................... 337/337
4,215,332 A * 7/1980 Wharton ..................... 337/394
4,371,780 A * 2/1983 Gossler et al. ........... 219/457.1
4,379,287 A 4/1983 Tyler et al.
4,544,831 A * 10/1985 Bayer ...................... 219/445.1
4,555,688 A * 11/1985 Bayer ......................... 337/394

(Continued)

FOREIGN PATENT DOCUMENTS

DE 2943477 A1 5/1981

(Continued)

OTHER PUBLICATIONS

German Search Report corresponding to International Application No. 10 2005 057 105.0 dated Aug. 22, 2006.

(Continued)

*Primary Examiner*—Patrick J Assouad
*Assistant Examiner*—Bret Adams
(74) *Attorney, Agent, or Firm*—Alston & Bird LLP

(57) ABSTRACT

An arrangement for controlling a radiant heater of a cooktop comprising a power controller, a changeover switch and a rod controller in a first operating mode which provides for the interruption of operation at temperatures of approximately 600° C. at a first switching point on the rod controller. In a second operating mode, a switch in the rod controller is set to a different switching point resulting in interruption of the power supply at temperatures of approximately 80° C., so that the radiant heater makes it possible to keep food hot without boiling.

24 Claims, 2 Drawing Sheets

U.S. PATENT DOCUMENTS

| | | | | |
|---|---|---|---|---|
| 4,561,849 | A | 12/1985 | Eichweber | |
| 4,604,603 | A * | 8/1986 | Place | 337/394 |
| 4,755,655 | A * | 7/1988 | Reiche et al. | 219/448.11 |
| 4,889,971 | A * | 12/1989 | Bayer | 219/448.19 |
| 5,128,661 | A | 7/1992 | Fowler | |
| 5,310,993 | A * | 5/1994 | McWilliams et al. | 219/448.19 |
| 5,825,276 | A * | 10/1998 | Morbitzer | 337/394 |
| 6,304,165 | B1 * | 10/2001 | Petri et al. | 337/394 |
| 6,514,031 | B1 | 2/2003 | Cook | |
| 6,838,785 | B2 | 1/2005 | Schilling | |
| 6,867,379 | B2 | 3/2005 | Hayashi | |
| 6,940,048 | B2 * | 9/2005 | Wilkins | 219/448.13 |
| 6,949,723 | B2 | 9/2005 | Staebler et al. | |
| 2002/0011480 | A1 * | 1/2002 | Schilling et al. | 219/448.11 |
| 2003/0072352 | A1 * | 4/2003 | Muziol | 374/208 |
| 2005/0078027 | A1 | 4/2005 | Philipp | |

FOREIGN PATENT DOCUMENTS

| | | | |
|---|---|---|---|
| DE | 3234349 | A1 | 3/1984 |
| DE | 3508585 | A1 | 9/1985 |
| DE | 3613902 | A1 | 10/1987 |
| DE | 10141754 | A1 | 4/2003 |
| GB | 1277848 | | 6/1972 |
| GB | 2 336 255 | A | 10/1999 |

OTHER PUBLICATIONS

Search Report for European Application No. EP06 024087, (Aug. 13, 2008).

German Search Report corresponding to International Application No. 10 2005 057 105.0 dated Aug. 22, 2006.

* cited by examiner

≈80°C
≈600°C
11
13
15
16
17
19
20
22
23
25
27
28
30
31
32
34
P1
P2

TEMPERATURE SENSOR FOR A HEATING MECHANISM AND METHOD FOR CONTROLLING THE HEATING MECHANISM

CROSS REFERENCE TO RELATED APPLICATIONS

This application claims priority from German Application No. 10 2005 057105.0, which was filed on Nov. 25, 2005, of which the contents are hereby incorporated by reference.

FIELD OF APPLICATION

This invention relates to a temperature detection device for a heating device in conjunction with a power controller or power regulator and a method for controlling a heating device in a first, normal power range and a second, lower power range.

BACKGROUND

For heating devices or cooktops (e.g., hobs), it is known that they operate in a first operating mode cooking utensils and their contents are heated at temperatures above 200° C. (e.g. boiling foods or frying). In a second operating mode, it is possible to keep a cooking container and its food hot at a lowerpower level and temperature well below 100° C., i.e. without boiling. In the first mode the cooktop surface is protected against damage by reaching high temperatures by means of a mechanical temperature detection device, also known as a rod controller. Such rod controllers are e.g. known from U.S. Pat. No. 5,113,170 or DE-A-102004023787 and have a switching point in a range 500 to 600° C. The heating device is switched then off on reaching or exceeding the same temperature. Another switching point is defined in the form of a so-called "hot" indication at approximately 70° C. This indicates by means of a lamp or the like to an operator when the hob is too hot for contact.

Thus, there is a need to provide such a device and method enabling the problems of the prior art to be avoided and so as to, in particular, permit a better control or regulation of a heating device, particularly in different operating modes.

BRIEF DESCRIPTION OF THE DRAWINGS

Embodiments of the invention are described hereinafter relative to the attached diagrammatic drawings, wherein.

DETAILED DESCRIPTION

Figures 1, 2, 3, 4, 5:
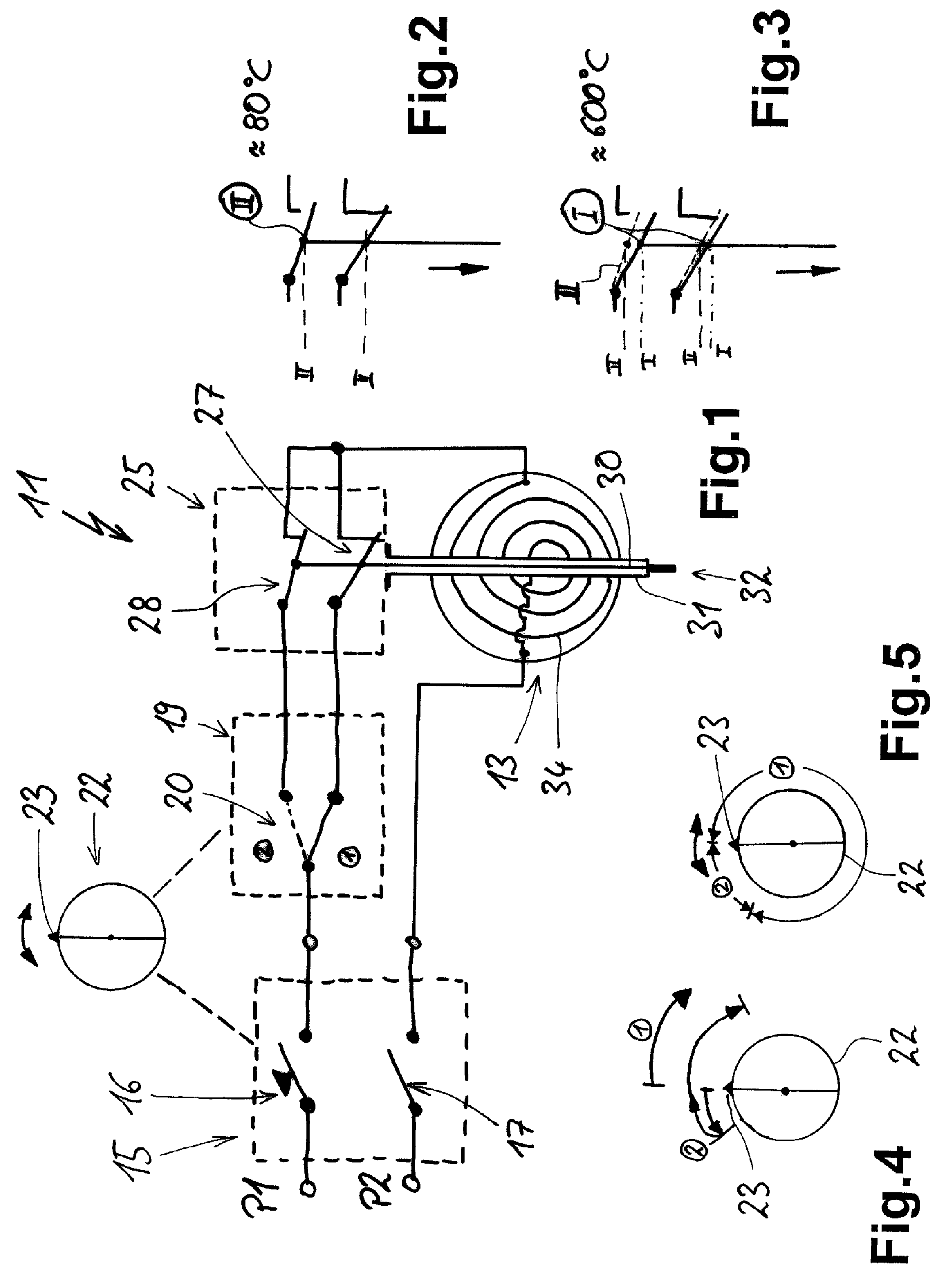
FIG. 1 illustrates one embodiment of the present invention of a control and wiring diagram for an inventive device with energy controller, changeover switch, rod controller and heating device.
FIGS. 2 & 3 illustrates an embodiment of first and second switching points on the rod controller.
FIGS. 4 & 5 illustrates an embodiment with two different diagrammatic representations of the activation of a control method with the first or second switching point.

One embodiment of the present invention provides a temperature detection device having the features of claim 1 and a method having the features of claim 20. Advantageous and preferred developments of the invention form the subject matter of the further claims and are explained in greater detail hereinafter. By express reference the wording of the claims is made into part of the content of the description. Some of the features explained hereinafter will only be described once. However, independently thereof, they apply both to the temperature detection device and to the control method.

According to the invention, the mechanical or thermomechanical temperature device has a sensor for detecting the temperature of the heating device or thereabouts and consequently from the fundamental operating standpoint corresponds to the device known from U.S. Pat. No. 5,113,170 and DE-A-102004023787. The heating device is advantageously a per se known radiant heating device for a hotplate of a cooktop. The sensor comprises two, advantageously elongated, rod-like parts having a different thermal expansion behaviour and thus produces a relative movement between the same, which gives rise to a switching movement. Along the switching path of this switching movement there are at least two switching points at different locations. At each switching point is provided a switch and corresponding electric contacts, which operates on reaching said switching point. A first switching point is at a temperature of several 100° C., e.g. 500 to 700° C. Another, lower, second switching point, in a first variant of the invention, is at a temperature below 100°C., e.g. 60 to 90° C., and is consequently a 'keeping-hot' function. In a second variant, the lower, second switching point is such that a temperature of 180 to 220° C., e.g. 200° C. is maintained at the bottom of the cooking utensil, and consequently a frying function is implemented. However, according to the invention, the lower, second temperature can vary. Thus, no matter how high the second temperature is, it can be maintained during operation.

For both switching points, the switches or electric contacts result in the power of the heating device being modified or the heating device being switched on or off or having a reduction in its capacity. In particular, on exceeding the given switching points, the power of the heating devices is reduced and in certain circumstances to a significant extent. If the heating devices are operated in a fixed cycle operation, i.e., are only switched on or off with full power, said heating devices are switched off.

Thus, the invention makes it possible for the temperature detection device to switch off the heating device so as to protect against excessive temperatures, particularly at a cooking surface or glass ceramic surface of the cooktop. Advantageously, a corresponding switch in the temperature detection device reduces the temperature of the heating device or directly switches it off. This safety function can be used for normal boiling operation. However, it is also possible in another mode, which is designed solely for keeping food hot at lower temperatures or for frying food with intermediate temperatures, to provide or use the second switching point on the temperature detection device, which here permits a type of thermostatic operation without any other regulating or controlling devices. The devices conventionally used as power regulators or power controllers, for keeping hot operation, suffer in part from the disadvantage that even in the lowest power stage they still deliver too much power to the heating device. Consequently, after a certain, but admittedly long time, the product in the cooking container could boil. However, the invention more particularly makes it possible to relatively precisely regulate, i.e., in said second, other temperature range with a predetermined temperature. Such a control precision cannot be achieved with conventional power regulators, controllers or the like. Then, in the low temperature range, it is only possible to set and maintain power stages and not the final temperatures. Also, at high temperatures it is important to keep the temperature in a roughly precise manner, independently of influences such as the saucepan quality or the like.

Whereas advantageously the first switch or electric contacts can directly switch, or switch off, the heating device at the first switching point, there are two possibilities for the second switching point. First, it is possible for a second switch or electric contact for the second switching point to also directly switch on or off the heating device and then its switching power must be designed for this purpose. Second, it is possible for the temperature detection device to contain a per se known, standard signal switch as the second switch, i.e., designed for a very low switching power. This second switch can then control or trigger a further switch or power switch for a corresponding switching of the heating device power. It is possible in this case to use a known, aforementioned temperature detection device. The device only has to be adapted to the individual use case, particularly by a corresponding setting of the second switching point to a desired temperature. The further power switch can e.g. be provided close to the temperature detection device or on a power controller. This further switch is advantageously a power relay. If the switch for the second switching point is constructed as a make contact, i.e., on exceeding the corresponding temperature at the second switching point, the second switch is closed, advantageously the further or third switch is opened in order to switch off the heating device.

As described hereinbefore, for the 'keeping-hot' function, the second switching point should be chosen in such a way that food is heated, but not yet boiled and should therefore be below 100° C. Particularly advantageous for the keeping hot function are temperatures of 50 or 60 to 90° C., particularly advantageously approximately 70 to 80° C. The switching point is chosen or set taking into account of certain tolerances in the detection precision of the temperature detection device, so that food only to be kept hot on the hob or over the heating device does not boil. Advantageously, account is taken of the fact that there is normally a temperature difference between the temperature below a hob surface and on the temperature detection device and on a mounted cooking product container. To this extent, the aforementioned temperatures for the second switching point may have to be modified in such a way that the indicated temperatures or temperature ranges for the second switching point should, if possible, prevail on the top of a hob or a cooking product container placed thereon. The corresponding points apply to the frying function, but which are at higher temperatures.

Advantageously, the device according to the invention is connected to an electromechanical power controller or cooperates therewith and in a particularly advantageous manner, an inventive means can have one of these devices. Such a power controller is e.g. known from U.S. Pat. No. 6,211,582. It advantageously has at least two switching ranges, which in one variant, is a rotary controller having rotation angle ranges. In one of the switching ranges, the power supply for the heating device is set to reach the first switching point, i.e., for boiling operation with high power levels and temperatures. In another or second switching range, the power supply to the heating device is only intended to bring about the reaching of the second switching point, i.e., at a much lower level for keeping hot purposes. Advantageously, the different switches or contacts in the temperature detection device are activated or controlled. In particular, the second switch for the second switching point only interrupts the power supply to the heating device when the power controller in the corresponding, second switching range is operating or set. It can be particularly advantageous for lower temperatures to have a range with small rotation angles or a smaller rotation of the power controller from a zero setting until the second switching point is reached. A further extending or following range with larger rotation angles is used for reaching the first switching point, i.e., the higher temperatures in boiling operation. If a higher temperature is to be regulated for the frying function, obviously larger rotation angles are possible. However, advantageously use is made of the alternatives described hereinafter.

An alternative to the aforementioned permanent or basic subdivision into different rotation angle ranges in a rotary controller, for reaching or setting the second switching point is possible. This involves a different setting or rotary movement than for the first switching point or for the normal boiling operation. For reaching or setting the second switching point, the rotary controller is firstly rotated in one direction, preferably starting with the otherwise highest boiling stage, up to a stop or beyond a given point. It is then once again rotated in the other "normal" direction with a minimum rotation angle for activating the 'keeping hot' operation with the second switching point. Thus, with the aforementioned power controllers, rotation starts from the zero setting and continues by a small amount in one direction, directly towards the normally highest boiling stage, and then back in the other direction, e.g., then with a rotation angle of at least 60° or even over 90°. This serves to provide a power timing for the heating device, which in the case of 9 stages for the 'keeping hot' function, should correspond advantageously to at least stage 4 or 5. This makes it possible to ensure that the power timing in itself does not lead to the power at the heating device being too low in order to achieve the desired keeping hot temperature with the second switching point or that this is reached as rapidly as possible. For the frying function the power timing should correspond to stage 7 to 9. This can be shown by inscriptions on the rotary controller. In place of a setting by means of the rotation angle, the function can be activated by axially pulling or pressing the rotary controller. This does not impair the rotation angle range. Inscriptions concerning operation of the additional function over the rotation range can be provided on the rotary toggle or on the panel. Thus, the additional function is made clear to an operator and in particular the corresponding rotation angle range is indicated.

As conventionally with the aforementioned temperature detection devices, a prescribed residual heat indication is activated at the second switching point. In the described other use of said switching point, it is either possible to use the reaching of the switching point occurring in all cases, or alternatively a RC-element with a capacitor can be provided. The latter is charged upon switching on the heating device and is discharged following the switching off of the heating device by means of a glow lamp, or the like, as an optically readily detectable residual heat indication. The capacitance of the capacitor is advantageously determined in such a way that the indication or display time of the residual heat display lasts at least a few minutes. In this case, the residual heat indication does not take place through the detection of the temperature actually present on the hob after switching off the heating device, but instead on the basis of empirical values.

The actual power at the heating device applied on operating with the second switching point, i.e., for the keeping hot function, can be defined to be in a range between 5 and 20% of the maximum power. In one embodiment, it can be advantageously approximately 10%. For the frying function, the range can be between 70 and 90%.

The temperature detection device is advantageously constructed as a mechanical or thermomechanical functional unit and the power regulators or controllers are advantageously constructed as electromechanical functional units. It is possible to make use of the aforementioned, known functional units and to correspondingly slightly modify the same. The invention can also be embodied using the aforementioned means constituted by the temperature detection device and power regulator/controller, as well as heating device, i.e., as a ready-to-operate appliance, particularly as a hob. Such a hob with several radiant heaters for the hotplates can be constructed in such a way that some hotplates are designed for the keeping hot function and other hotplaces are designed for the frying function.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

DETAILED DESCRIPTION OF THE EMBODIMENT

FIG. 1 shows a device 11 with various units used for controlling or regulating the power of a radiant heating device 13. Such units can be installed under a generally known glass ceramic cooktop. Device 11 has a power controller 15 with a first power controller switch 16 and a second power controller switch 17, as well as a changeover switch 19 with a changeover switching contact 20. The power controller 15 and changeover switch 19 are operated by means of a mechanical rotary toggle 22, which has a rotation position indication 23 in the form of a tip or point. This makes it possible to establish at all times the angular position of the rotary toggle 22. As shown and explained hereinafter relative to FIGS. 4 and 5, rotary toggle 22 can be rotated in both directions. This makes it possible to influence both the timing ratio (duty cycle) or power supply at power controller 15 and the switch position of the changeover switching contact 20 in changeover switch 19 between position 1 and position 2.

A rod controller 25 is connected to changeover switch 19 as the temperature detection device. As a conventional rod controller, such as is e.g. known from U.S. Pat. No. 5,113,170 or DE-A-102004023787, it has a first controller contact 27 and a second controller contact 28. The latter are operated by means of an e.g. ceramic longitudinal rod 30 mechanically connected thereto. Said longitudinal rod runs in a metallic rod controller tube 31 and in this way both the rod and tube form the sensor 32.

Sensor 32 projects over the radiant heater 13, which has a spirally directed heating resistor 34 as the actual heating device, whose power supply is provided by means of one of the two controller contacts 27 or 28 and the second power controller switch 17 of power controller 15, which is used merely for two-pole disconnection.

The basic function of power controller 15, changeover switch 19, rod controller 25 and the structure of radiant heater 13 largely correspond to what is known from the prior art in connection with their function. The special feature is more particularly constituted by the changeover switch 19 or the control or wiring of the controller contacts of rod controller 25, particularly the second controller contact 28.

Figure 6:
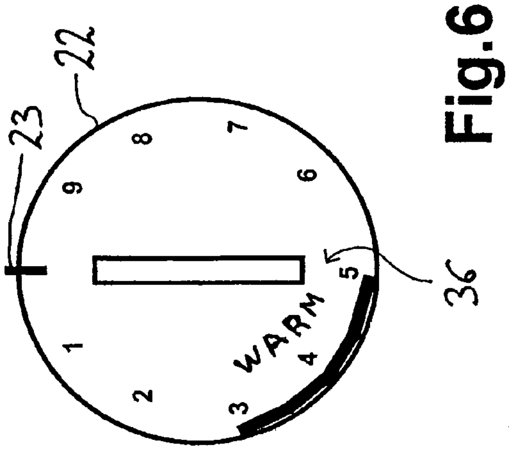
FIGS. 6 & 7 illustrates an embodiment with two different types of inscription in the rotary toggle.

FIG. 6 shows in larger scale plan view a rotary toggle 22. It carries an inscription of boiling stages 1 to 9, starting at rotation position indication 23 and running counterclockwise. At the bottom left is the inscription 36 of the rotation angle range for the additional function of 'keeping hot' directly located on the rotary toggle. Thus, if the rotary toggle 22 is turned to the right in such a way that this inscription 36 or boiling stages 3 to 5 are at the top, then the previously described keeping hot function is set.

Figure 7:
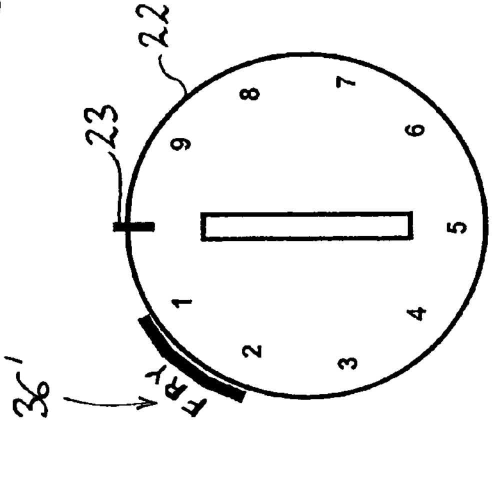

FIG. 7 discloses another embodiment, wherein the inscription 36' for the frying function is located on the panel behind the rotary toggle, as opposed to on the toggle itself, as shown in FIG. 6. Here the rotary toggle 22 is turned so far to the right (clockwise) that the rotation position indication 23 is directed towards inscription 36'. This roughly corresponds to boiling stage 8 or 9 and at this position the previously described additional frying function is set.

Figure 8:
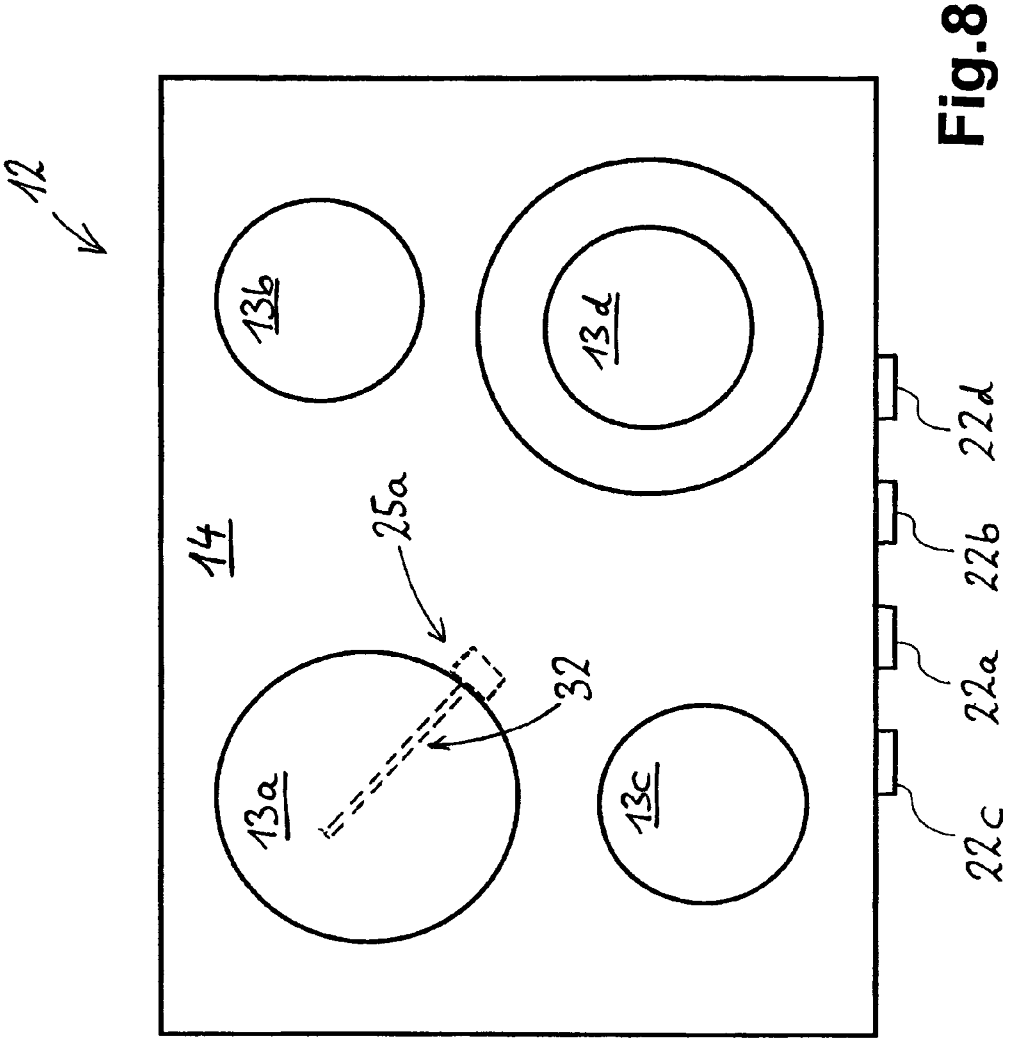
FIG. 8 illustrates a plan view of an inventive hob with four hotplates and in each case the additional function.

FIG. 8 shows a hob 12 in plan view. The hob 12 has four radiant heaters 13*a* to 13*d* forming corresponding cooking areas on a glass ceramic hob surface 14. Radiant heater 13*d* to the front right forms a two-circuit hotplate known from the prior art. The rod controller 25*a* for radiant heater 13*a* is shown in broken line form.

On the front of hob 12 there are four rotary toggles 22*a* to 22*d* and their association with the hotplates is such that the far left rotary toggle 22*c* is associated with the front left hotplate. The association of the rotary toggle 22 to the right thereof takes place clockwise from hotplate 13*c*.

The association of the additional functions of hotplates 13 is as follows. The two rear hotplates 13*a*, 13*b* have as the additional function the keeping hot function with a setting to a temperature between 70 and 90° C. The two front hotplates 13*c*, 13*d* have as the additional function the frying function with a second switching point for a pan bottom temperature of around 200° C.

For rotary toggle 22*d* of hotplate 13*d*, use can be made of a so-called three-circuit power controller, such as is known from the prior art.

By modifying the switching contacts or switching paths in the power controller, it is possible to obviate the need for an additional switch or changeover switch 19. A pilot lamp or the like can be used for indicating the selected function.

Function

In connection with FIGS. 1 to 3 it will be firstly be explained how the rod controller 25 functions with the two positions 1 and 2 of the changeover switching contact 20 and switching points I and II according to FIGS. 2 and 3. The representation of the two controller contacts 27, 28 of rod controller 25 in FIG. 1 is intended to show that the rod controller tube 31 expands on heating sensor 32, but the ceramic longitudinal rod 30 does not. Thus, the longitudinal rod 30 is drawn away from the rod controller 25 and can operate the first controller contact 27 and the second controller contact 28. The first controller contact 27 is constructed in such a way that it is still closed over a certain movement of longitudinal rod 30 along its switching path. Only at temperatures around 600° C., as shown in FIG. 3, is the expansion of the rod controller tube 31 and therefore the switching movement of longitudinal rod 30 sufficient to open the first controller contact 27. However, this switching point is adjustable for adapting to specific, predetermined switching temperatures, which is generally known and need not be further illustrated here. If the changeover switch 19 with the changeover switching contact 20 is in the lower position 1 and the power supply to the radiant heater 13 takes place via the first controller contact 27, as from this temperature of approximately 600° C. at switching point I shown in dot-dash line form, the power control is interrupted, e.g. in order to protect against excess temperature a glass ceramic hob surface located above the same.

If the changeover switching contact 20 is in the upper position 2, the power control of the radiant heater 13 takes place via the second controller contact 28. As is also shown in FIG. 2, the second controller contact 28 is opened much earlier, namely at switching point II shown in broken line form and which with regards to the switching movement of sensor 32 corresponds to a temperature of approximately 80° C. over radiant heater 13. Switching point II is also shown in FIG. 3 in such a way that it is also possible to see in broken line form the positions of the switching arms of controller contacts 27 and 28.

This means that switching point II is reached much earlier or at much lower temperatures than switching point I. The approximately 80° C. of switching point II roughly corresponds to what is implemented in part as the switching point for activating the hot display via rod controller 25. The second controller contact 28 is constructed in such a way that it is closed at the second switching point II in order to activate an optical hot display through LEDs or the like. If the switching procedure of the second controller contact 28 cannot, or is not to be redesigned according to FIGS. 1 to 3, i.e., it remains a closing switch on exceeding the second switching point II, via said second controller contact 28, a separate power relay can be provided in the control of radiant heater 13. It opens on closing the second controller contact 28, i.e. on exceeding the temperature of approximately 80° C. and therefore switches off the heating device in the corresponding mode. This power relay is then provided in a second branch starting from the changeover switch 19 to heating resistor 34.

In the aforementioned operating procedure it must be borne in mind that in particular for mode 1, i.e. the normal heating operation for boiling or frying, the level of power generated is adjusted by means of power controller 15 and the first power controller switch 16. As will be explained hereinafter, this power level can be adjusted by means of rotary toggle 22. Rotary toggle 22 can also influence the position of the changeover switching contact 20 and in theory a further switch can be provided here.

This is illustrated by FIGS. 4 and 5. FIG. 4 shows a construction in which, starting from the zero setting with the tip 23 pointing upwards, the rotary toggle for mode 1 is turned clockwise to the right. Thus, a power level starting at low power stages can be set and this increases with further rotation. This constitutes the power setting for a boiling or frying process at high temperature.

If mode 2 is chosen, i.e. only keeping hot at a low temperature of approximately 80° C. or a frying process with a maintained high temperature, the rotary toggle 22 is firstly turned to the right up to the position designated 2, e.g. up to a stop or beyond a locking stage. It is then turned to the right by a certain minimum rotation angle, e.g. 60°. Due to the fact that the rotary toggle 22 is firstly turned to the left and then to the right, changeover switch 19 is operated, only the 'keeping hot' or thermostatic operation is possible on radiant heater 13. The choice of specific power stages is now no longer possible. In particular, through the illustrated rotation angle of roughly 60° a power stage is set on power controller 15 which makes more power available than can be transferred to radiant heater 13 via the temperature switching behaviour of rod controller 25 at switching point II. The specific construction of the rotary toggle 22 for power controller 15 and changeover switch 19 is left to the expert and causes no problem to him due to his routine skill. Such switching movements are also basically known through the activation of so-called parboiling stages or the like.

FIG. 5 illustrates an alternative construction. Here, although not indicated further in the figure, the rotary toggle 22 is connected to power controller 15 and changeover switch 19. In a first angular range of 0 to approximately 300° C., it is normally possible to rotate to the right in mode 1 with ever increasing power stages. With the indicated angle of approximately 300°, on further rotation automatically and necessarily there is a change to mode 2, i.e. from boiling or frying to 'keeping hot.' This can be achieved more easily from the mechanical standpoint than the solution according to FIG. 4. However, here there is a loss of a certain angular range for the fine setting of the power level in mode 1. In order to prevent an accidental overswitching into mode 2, it is possible to provide a clearly detectable and over-comeable barrier between the two, or alternatively the rotary toggle 22 can only be rotated to the right up to an angle of approximately 300°. To set mode 2, it must be rotated to the left starting from the zero setting.

The invention claimed is:

1. A temperature detection device for a heating device of a cooking appliance with a power controller or power regulator, the temperature detection device having a sensor with a first part and a second part wherein each part has a different thermal expansion behaviour for temperature detection on the heating device, wherein as a result of the different thermal expansion behaviour on the first part and second parts, the sensor produces a relative movement for performing a switching movement along a switching path on the temperature detection device, the switching movement having a first switching point and a second switching point at a first location and a second location along the switching path, wherein switches or electrical contacts are associated with the first location and the second location provided for operation by the sensor on reaching either the first switching point or second switching point, wherein the first switching point is at a temperature of at least 500 C and the second switching point is at a temperature of less than 100 C, the switches or electrical contacts bringing about the switching of the power of the heating device at both the first switching point and second switching point.

2. The temperature detection device according to claim 1, wherein the switch or electrical contact for the first switching point switches the power of the heating device and is directly electrically connected to the heating device for this purpose.

3. The temperature detection device according to claim 1, wherein the switch or electrical contact for the second switching point directly switches the power of the heating device and is directly electrically connected to the heating device for this purpose.

4. The temperature detection device according to claim 1, wherein the switch associated with the second switching point switches a signal controlling a further switch and said further switch directly switches the full power of the heating device.

5. The temperature detection device according to claim 4, wherein the further switch is a power relay.

6. The temperature detection device according to claim 1, wherein the first switching point is in a range of approximately 600 to 700 C.

7. The temperature detection device according to claim 1, wherein the second switching point is in a range of approximately 60 to 90 C.

8. The temperature detection device according to claim 1, wherein the second switching point is chosen in such a way that the temperature of the bottom of a saucepan placed on a surface under which said surface is mounted said temperature detection device is approximately 180 to 220 C.

9. The temperature detection device according to claim 1, wherein the temperature detection device is connected to, or has an electromechanical power controller, which is provided with at least two switching ranges comprising a first and second switching range, wherein in the first switching range the power supply to the heating device is constructed for reaching the first switching point and in the second switching range the power supply is constructed for reaching the second switching point.

10. The temperature detection device according to claim 9, wherein in each switching range another switch or electrical contact in the temperature detection device is controlled or activated.

11. The temperature detection device according to claim 9, wherein the power controller is a rotary controller and the two switching ranges correspond to different rotation angle ranges.

12. The temperature detection device according to claim 11, wherein the second switching range with a first rotation angle is constructed for reaching the second switching point and the first switching range with a second rotation angle is constructed for reaching the first switching point wherein the first rotation angle is less than the second rotation angle.

13. The temperature detection device according to claim 9, wherein for reaching or setting the second switching point a different setting movement or rotary movement is provided than for reaching or setting the first switching point.

14. The temperature detection device according to claim 13, wherein the power controller is a rotary controller and for reaching or setting the second switching point the rotary controller is firstly rotatable in one direction up to a stop and then in another direction with a minimum rotation angle.

15. The temperature detection device according to claim 1, wherein a glow lamp and an RC-element with a capacitor are provided for a visual residual heat indication, the capacitor being charged on switching on the heating device and being discharged via the glow lamp after switching off the heating device.

16. The temperature detection device according to claim 15, wherein the capacitance of the capacitor is determined in such a way that the visual heat indication lasts a few minutes.

17. The temperature detection device according to claim 1, wherein the power at the heating device, which is applied in averaged form over a long period of time, on operating with the second switching point at a lower temperature between 60 and 90 C, is between 5 and 20% of that when operating with the first switching point.

18. The temperature detection device according to claim 1, wherein the average power applied to the heating device when operating with the second switching point at a temperature between 180 and 220 C, is between 70 and 90% of the maximum power.

19. The temperature detection device according to claim 1, wherein the power controller or power regulator is constructed as an electromechanical unit.

20. A method for controlling a heating device in a first, normal power range and a second, lower power range, the heating device being supplied with power via a supply path with a power controller and a mechanical temperature detection device in the supply path, the temperature detection device having two switching points wherein a first switching point is set to cause a temperature of at least 500 C at the heating device and a second switching point is set to cause a lower temperature at the heating device, wherein the heating device for the second, lower power range is timed with the second switching point the method steps comprising:

setting a rotary controller to either the first or second switching point, causing power being applied to the heating device;

monitoring the temperature via the temperature detection device; and removing power to the heating device when the temperature detected reaches a certain temperature associated with the respective switching point.

21. The method according to claim 20, wherein the mechanical temperature detection device is directly connected to the heating device and switches off the power when the temperature is above 500 C.

22. The method according to claim 20, wherein the first switching point is used for heating a cooking container with temperatures adjustable through a rotary controller.

23. The method according to claim 20, wherein the second switching point is used for keeping hot or thawing a cooking product in a cooking container on the heating device.

24. The method according to claim 20, wherein the second switching point is used for frying a cooking product in a cooking container on the heating device.

* * * * *